(12) United States Patent
Sheng

(10) Patent No.: US 11,025,881 B2
(45) Date of Patent: Jun. 1, 2021

(54) METHOD, COMPUTER STORAGE MEDIA, AND CLIENT FOR SWITCHING SCENES OF PANORAMIC VIDEO

(71) Applicant: Alibaba Group Holding Limited, Grand Cayman (KY)

(72) Inventor: Xiaojie Sheng, Shanghai (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/374,607

(22) Filed: Apr. 3, 2019

(65) Prior Publication Data
US 2019/0313079 A1   Oct. 10, 2019

(30) Foreign Application Priority Data
Apr. 4, 2018   (CN) .......................... 201810300319.4

(51) Int. Cl.
*H04N 13/106*   (2018.01)
*H04N 13/194*   (2018.01)
*H04N 5/232*    (2006.01)

(52) U.S. Cl.
CPC ....... *H04N 13/158* (2018.05); *H04N 5/23238* (2013.01); *H04N 13/194* (2018.05)

(58) Field of Classification Search
CPC ............. H04N 13/158; H04N 5/23238; H04N 13/194; H04N 5/23293
See application file for complete search history.

(56) References Cited

U.S. PATENT DOCUMENTS

| | | |
|---|---|---|
| 5,729,471 A | 3/1998 | Jain et al. |
| 7,058,239 B2 | 6/2006 | Singh et al. |
| 7,123,777 B2 | 10/2006 | Rondinelli et al. |
| (Continued) | | |

FOREIGN PATENT DOCUMENTS

| | | |
|---|---|---|
| CN | 100440330 | 12/2008 |
| CN | 102187667 | 9/2011 |
| (Continued) | | |

OTHER PUBLICATIONS

PCT Search Report and Written Opinion dated Jul. 5, 2019 for PCT Application No. PCT/US19/25634, 7 pages.
(Continued)

*Primary Examiner* — Tat C Chio
(74) *Attorney, Agent, or Firm* — Lee & Hayes, P.C.

(57) ABSTRACT

A method, a computer storage medium, and a client for switching scenes of a panoramic video are provided. The method includes playing a first primary video stream in a first video stream group associated with a first perspective of a user; determining a video stream switching time when a perspective of the user is switched from the first perspective to a second perspective, the video stream switching time being associated with a time length of a video slice in a second backup video stream; and switching from the first primary video stream to the second backup video stream when a play time of the first primary video stream reaches the video stream switching time, so that content of the second backup video stream starting from the video stream switching time is played. The present application can improve the effects of switching between scenes of the panoramic video.

20 Claims, 6 Drawing Sheets

(56) References Cited

U.S. PATENT DOCUMENTS

| | | | |
|---|---|---|---|
| 7,720,356 B2* | 5/2010 | Seo | G11B 27/034 |
| | | | 386/240 |
| 8,164,655 B2 | 4/2012 | Lablans | |
| 8,599,266 B2 | 12/2013 | Trivedi et al. | |
| 8,600,220 B2* | 12/2013 | Bloch | H04N 21/23439 |
| | | | 386/293 |
| 9,304,585 B2 | 4/2016 | Fujii et al. | |
| 9,573,062 B1 | 2/2017 | Long et al. | |
| 10,306,186 B2 | 5/2019 | Chuang et al. | |
| 10,362,290 B2 | 7/2019 | Cole et al. | |
| 2007/0182812 A1 | 8/2007 | Ritchey | |
| 2011/0161517 A1 | 6/2011 | Ferguson | |
| 2015/0015789 A1 | 1/2015 | Guntur et al. | |
| 2015/0172543 A1 | 6/2015 | Laroia | |
| 2016/0295128 A1 | 10/2016 | Schnittman et al. | |
| 2017/0070772 A1 | 3/2017 | Nakamura et al. | |
| 2017/0195561 A1 | 7/2017 | Hegelich et al. | |
| 2017/0339507 A1 | 11/2017 | Hsu | |
| 2017/0374120 A1* | 12/2017 | Vishnia | H04L 65/601 |
| 2018/0302689 A1 | 10/2018 | Todorovic et al. | |
| 2019/0058870 A1 | 2/2019 | Rowell et al. | |

FOREIGN PATENT DOCUMENTS

| | | |
|---|---|---|
| CN | 104735464 | 6/2015 |
| CN | 106534716 | 3/2017 |
| WO | WO2017205794 | 11/2017 |

OTHER PUBLICATIONS

Translation of the 1st CN OA dated Mar. 1, 2021 for CN Application No. 201810300319. 12 pages.

Translation of the 1st CN SR dated Mar. 1, 2021 for CN Application No. 201810300319. 2 pages.

\* cited by examiner

METHOD, COMPUTER STORAGE MEDIA, AND CLIENT FOR SWITCHING SCENES OF PANORAMIC VIDEO

CROSS REFERENCE TO RELATED PATENT APPLICATIONS

This application claims priority to Chinese Patent Application No. 201810300319.4, filed on 4 Apr. 2018, entitled "Method, Computer Storage Media, and Client for Switching Scenes of Panoramic Video," which is hereby incorporated by reference in its entirety.

TECHNICAL FIELD

The present disclosure relates to the field of Internet technologies, and particularly to methods, computer storage media, and clients for switching scenes of a panoramic video.

BACKGROUND

In order to reduce the pressure of rendering a panoramic video, the panoramic video is usually divided into a plurality of areas according to different perspectives, and the plurality of areas are respectively rendered according to different resolutions. In a transmission process of the video, transmission of the panoramic video is performed through individual video streams of the same number of areas, and the video streams are in one-to-one correspondence with the areas. For example, as shown in FIG. 1, a panoramic video can be divided into 8 different areas according to 8 different perspectives of a user, and perspectives 1, 2, 3, 4, 5, 6, 7, and 8 of the user are associated with video streams 1, 2, 3, 4, 5, 6, 7, and 8 respectively. A video of the area 1 in the panoramic video that is transmitted by the video stream 1 is rendered with a higher resolution, and videos of other areas are rendered with a lower resolution. As such, the resolution of the video of the area 1 corresponding to the perspective of the user is higher, and the picture quality is better. Although the resolution of the videos of other areas is relatively low and the picture quality is relatively poor, what the user actually sees is the video of the area 1 with the higher resolution, which does not affect viewing of the user.

However, as shown in FIG. 1 and FIG. 2, at time t1, an area corresponding to the perspective of the user is changed from an area corresponding to the perspective 1 to an area corresponding to the perspective 5. At that time, at least a period of time (t2−t1) is required for switching from the video stream 1 to a video slice on the video stream 5. During a waiting time, a video of an area corresponding to the perspective 5 that is viewed by the user is still a relatively low resolution video provided by the video stream 1. Since a time length of a video slice is generally 1 second (s), the waiting time often exceeds 500 milliseconds (ms), or even more than 1 s. As such, the user will notice that the video he/she is watching is blurred during the waiting time, which greatly affects the viewing experience of the user.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/ computer-readable instructions as permitted by the context above and throughout the present disclosure.

An objective of embodiments of the present application is to provide a method, a computer storage medium, and a client for switching scenes of a panoramic video, which can improve the effects of switching the scenes of the panoramic video.

To achieve the above objective, the embodiments of the present application provide a client. The client includes memory and a processor. The memory is configured to store a computer program and a plurality of video stream groups, and the video stream groups are related to perspectives of a user. The video stream group includes a primary video stream and a backup video stream displaying the same content, and a time length of a video slice in the backup video stream is less than a time length of a video slice in the primary video stream. The computer program, when executed by the processor, performs the following operations: playing a first primary video stream in a first video stream group associated with a first perspective of a user to the user; determining a video stream switching time in a second backup video stream of a second video stream group associated with a second perspective when a perspective of the user is switched from the first perspective to the second perspective, wherein the video stream switching time is correlated with a time length of a video slice in the second backup video stream; and switching from the first primary video stream to the second backup video stream to play to the user content of the second backup video stream starting from the video stream switching time when a play time of the first primary video stream reaches the video stream switching time.

To achieve the above objective, the embodiments of the present application further provide a computer storage medium. The computer storage medium is configured to store a computer program and a plurality of video stream groups, and the video stream groups are associated with perspectives of a user. The video stream group includes a primary video stream and a backup video stream displaying the same content, and a time length of a video slice in the backup video stream is less than a time length of a video slice in the primary video stream. The computer program, when executed by a processor, performs the following operations: playing a first primary video stream in a first video stream group associated with a first perspective of a user to the user; determining a video stream switching time in a second backup video stream of a second video stream group associated with a second perspective when a perspective of the user is switched from the first perspective to the second perspective, wherein the video stream switching time is correlated with a time length of a video slice in the second backup video stream; and switching from the first primary video stream to the second backup video stream to play to the user content of the second backup video stream starting from the video stream switching time when a play time of the first primary video stream reaches the video stream switching time.

To achieve the above objective, the embodiments of the present application further provide a method for switching scenes of a panoramic video. A plurality of video stream groups are provided, and the video stream groups are associated with perspectives of a user. The video stream group includes a primary video stream and a backup video stream displaying the same content, and a time length of a video slice in the backup video stream is less than a time length of a video slice in the primary video stream. The method includes: playing a first primary video stream in a first video stream group associated with a first perspective of a user to the user; determining a video stream switching time in a second backup video stream of a second video stream group associated with a second perspective when a perspective of the user is switched from the first perspective to the second perspective, wherein the video stream switching time is associated with a time length of a video slice in the second backup video stream; and switching from the first primary video stream to the second backup video stream to play to the user content of the second backup video stream starting from the video stream switching time when a play time of the first primary video stream reaches the video stream switching time.

As can be seen from the above, the present application can respectively associate a plurality of video stream groups with different perspectives of a user. The video stream group includes a primary video stream and a backup video stream displaying the same content, and a time length of a video slice in the backup video stream is less than a time length of a video slice in the primary video stream. In this case, when the user's perspective is switched from a first perspective to a second perspective, a primary video stream associated with the first perspective is switched to a second backup video stream associated with the second perspective within a time length of a video slice in the second backup video stream associated with the second perspective. In this way, although a time length of a video slice in the first primary video stream is relatively long, the technical solutions of the present application can complete switching between video streams in a relatively short time, so as to prevent the user from perceiving that a video that is viewed during a process of switching between the video streams is blurred, thereby improving the effects of switching scenes of a panoramic video.

BRIEF DESCRIPTION OF THE DRAWINGS

In order to more clearly illustrate the technical solutions of the embodiments of the present application or existing technologies, accompanying drawings that are needed in the description of the embodiments or the existing technologies will be briefly described herein. Apparently, the drawings in the following description represent merely a few embodiments described in the present application. Based on these drawings, one skilled in the art can obtain other drawings without making any inventive effort.

DETAILED DESCRIPTION

Figure 1:
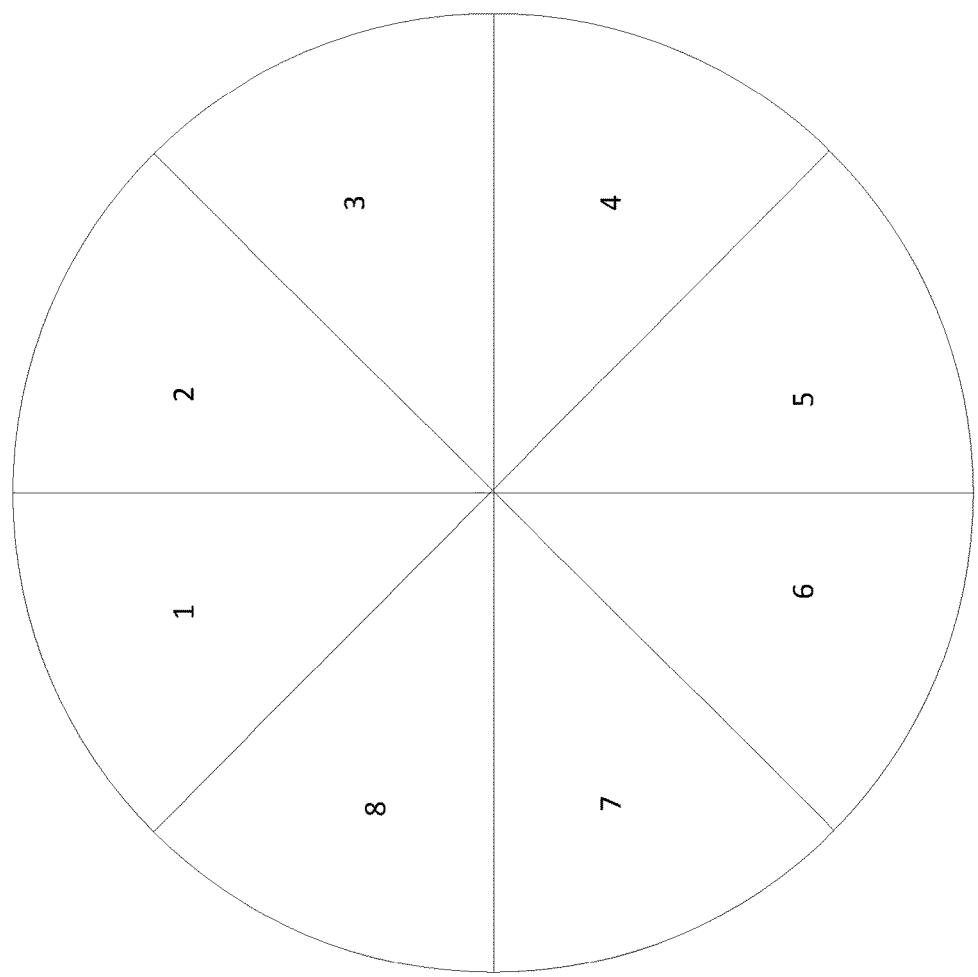
FIG. 1 is a schematic diagram of a division of a panoramic video area in the existing technologies.
Figure 2:
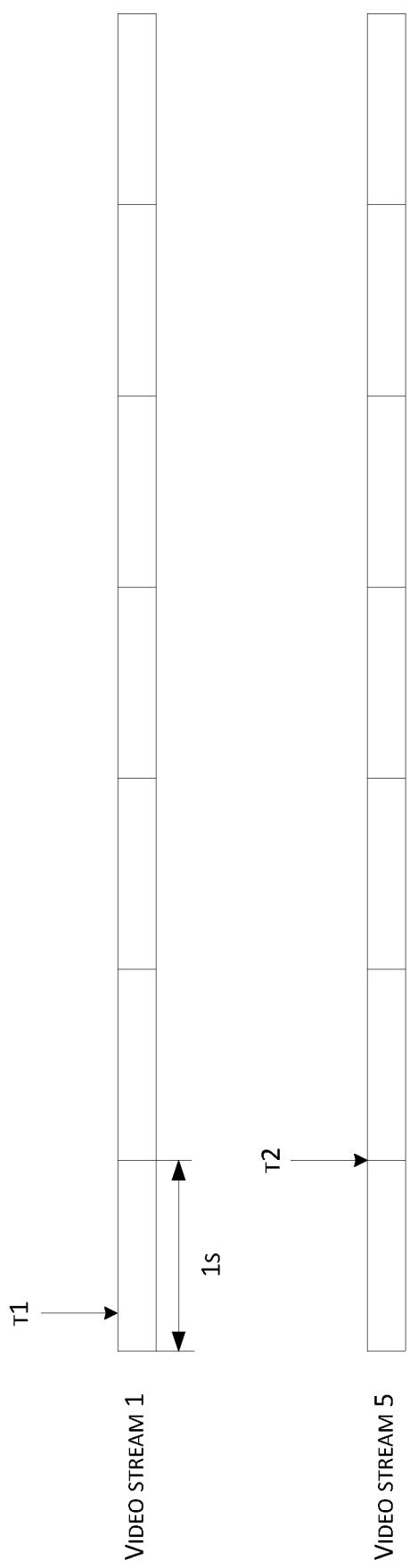
FIG. 2 is a schematic diagram of video stream switching in the existing technologies.

In order to enable one skilled in the art to better understand the technical solutions in the present application, the technical solutions in the embodiments of the present application will be clearly and completely described hereinafter with reference to the accompanying drawings in the embodiments of the present application. The described embodiments represent only a part and not all of the embodiments of the present application. Based on the embodiments of the present application, all other embodiments obtained by one of ordinary skill in the art without making any inventive effort shall fall within the scope of protection of the application.

The embodiments of the present application provide a method for switching scenes of a panoramic video. The method for switching scenes of a panoramic video can be applied in a system architecture of a client and a server. The server may be a device that stores panoramic video data. Specifically, the server may be a backend service server of a website capable of providing a video service. The website may be, for example, iQiyi, Sohu video, Acfun, and the like. In embodiments, the server may be an electronic device having functions of data computations, storage, and network interaction, or may be software running in an electronic device and providing support for data processing, storage, and network interaction. The embodiments do not impose any specific limitations on the number of servers. The server may be a single server, a number of servers, or a server cluster formed by a plurality of servers.

In embodiments, the client may be an electronic device that is configured to render panoramic video data and is capable of capturing a user's perspective. Specifically, the client may be, for example, a desktop computer, a tablet computer, a notebook computer, a smart phone, a digital assistant, a smart wearable device, a television with network access function, and the like, that possesses a function of capturing a perspective of a user. Alternatively, the client may also be software capable of running in an electronic device as described above. Specifically, the client may be a browser in an electronic device, and the browser may be loaded with an access portal provided by a video website platform. The video website platform may be, for example, iQiyi, Sohu video, Acfun, etc., and the access portal may be a front page of the website platform. The client may also be an application running in a smart terminal provided by a video website platform.

The embodiments of the present application provide a method for switching scenes of a panoramic video, and the method for switching scenes of a panoramic video can be applied in a client as described above. The method may be provided with a plurality of video stream groups, the video stream groups being associated with perspectives of a user. A video stream group as described includes a primary video stream and a backup video stream displaying the same content. A time length of a video slice in the backup video stream is less than a time length of a video slice in the primary video stream.

In embodiments, in order to reduce the pressure of rendering a panoramic video, the panoramic video may be generally divided into a plurality of areas according to different perspectives of a user, and videos of the plurality of areas are respectively rendered according to different resolutions. For example, a video of a specified area in the panoramic video may be rendered with a higher resolution, while videos of other areas of the panoramic video may be rendered with a lower resolution. Then, during a process of video transmission, the rendered panoramic video is transmitted through a video stream group corresponding to the specified area. In this way, for different perspectives of the user, a plurality of video stream groups can respectively transmit a plurality of panoramic videos of multiple resolutions that are associated with the perspectives of the user. Specifically, for example, as shown in FIG. 1, a panoramic video 100 can be divided into 8 different areas according to 8 different perspectives of the user. Perspectives 1, 2, 3, 4, 5, 6, 7, and 8 of the user are associated with video stream groups 1, 2, 3, 4, 5, 6, 7, and 8 respectively. Thus, a video of an area corresponding to the user's perspective 1 in a panoramic video that is transmitted by the video stream group 1 is rendered with a higher resolution, while videos of other areas are rendered with a lower resolution. Similarly, a video of an area corresponding to the user's perspective 2 in a panoramic video that is transmitted by the video stream group 2 is rendered with a higher resolution, while videos of other areas are rendered with lower resolution. Panoramic videos transmitted in other video stream groups are also rendered in a similar manner. In this way, the resolution of a video of an area corresponding to the user's perspective is higher, and the image quality is better. Although the resolution of other areas is lower and the image quality is relatively poor, what the user always sees is a video of an area 1 having a higher resolution, and the user's viewing is not affected.

In embodiments, the plurality of video stream groups may be stored in the server. In this way, when the user's perspective is a default perspective, the client may download a video stream group that is associated with the default perspective from the server, and play the video stream group that is associated with the default perspective to the user. In an event that the user's perspective is changed, when the video stream group is switched to a video stream group corresponding to a current perspective of the user, the client may download the video stream group corresponding to the current perspective from the server. Moreover, the client may also store the downloaded video stream group into a storage device to play the video stream group corresponding to the user's perspective to the user. The storage device may be a memory or a cache.

In embodiments, the video stream group may include a primary video stream and a backup video stream that display the same content. Specifically, panoramic video data transmitted by the primary video stream is the same as panoramic video data transmitted by the backup video stream. In a panoramic video characterized by the panoramic video data, a video of an area corresponding to the user's perspective that is associated with the primary video stream or the backup video stream is rendered with a higher resolution, and videos of other areas are rendered with a lower resolution.

In embodiments, the primary video stream includes a plurality of video slices, and the backup video stream also includes a plurality of video slices. A time length of a video slice in the backup video stream is less than a time length of a video slice in the primary video stream. Specifically, a time length of a video slice in the primary video stream may be 1 second or longer, and a time length of a video slice in the backup video stream may be 300 milliseconds, 200 milliseconds, or even shorter.

Figure 3:
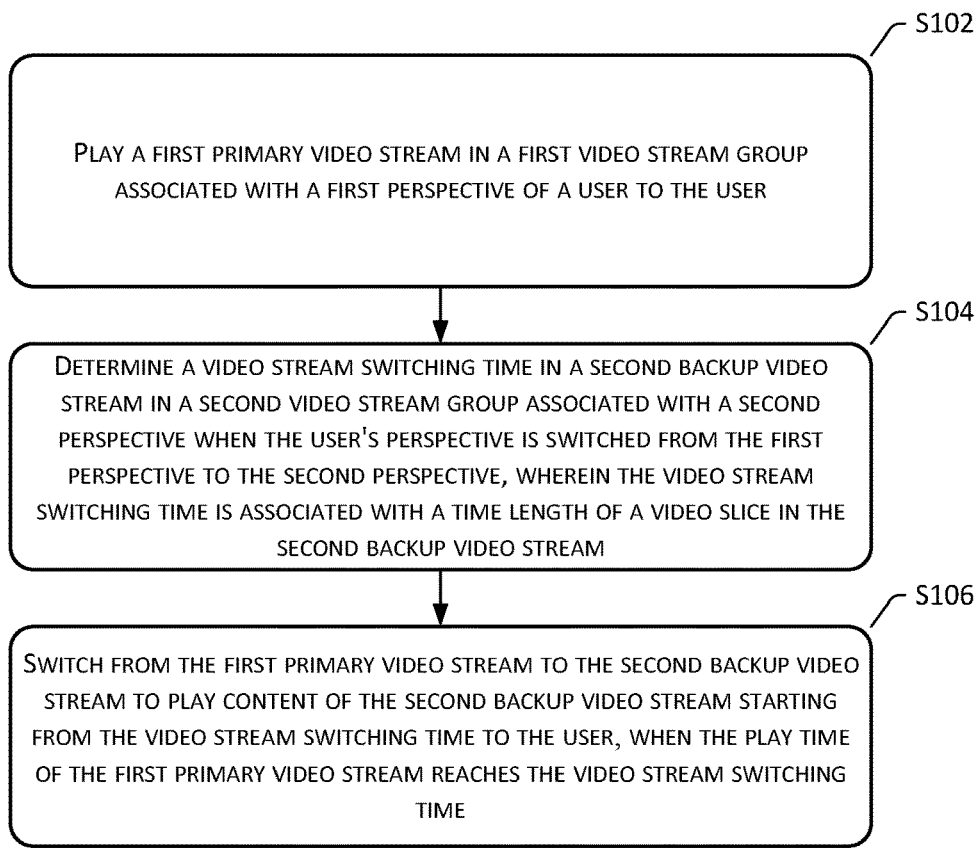
FIG. 3 is a flowchart of a method for switching scenes of a panoramic video in an embodiment of the present application.

Referring to FIG. 3, a method 300 for switching scenes of a panoramic video may include the following operations.

S102: Play a first primary video stream in a first video stream group associated with a first perspective of a user to the user.

In embodiments, a panoramic video database may be provided in the server. The panoramic video database may be a data set that stores panoramic video data. The panoramic video database may adopt any one of database formats such as MySQL, Oracle, DB2, and Sybase, etc. The panoramic video database can be deployed on a storage media in the server.

In embodiments, various types of panoramic video data may be stored in the panoramic video database. Each piece of the panoramic video data is associated with a perspective of a user. A perspective is specified from among different perspectives of the user. In a panoramic video characterized by panoramic video data associated with the specified perspective, a video of an area corresponding to the specified perspective is rendered with a higher resolution, and videos of other areas are rendered with a lower resolution. Moreover, each piece of panoramic video data in the panoramic video database can have its own data identification. The data identification and the panoramic video data may be stored in a form of a key-value (key-value pair), so that a corresponding piece of panoramic video data can be obtained from the panoramic video database through a data identification that is provided.

In embodiments, the panoramic video data can be drawn as a panoramic video according to a drawing standard. The drawing standard may be, for example, an Open GL standard, a WebGL standard, or the like. The panoramic video may be a spherical video centered at a specified observation point. The specified observation point may be a center point for observing the panoramic video, and an image observed at the specified observation point may be presented on a display for viewing by the user. In one aspect, the user can change the line of sight of the specified observation point by interacting with the display or an input device of the display. For example, when the user applies a gesture of swiping to the right on the display, the line of sight of the specified observation point can be deflected to the left accordingly, so that video information on the left side of the panoramic video can be presented on the display. In another aspect, the panoramic video data may be rendered by an electronic device having a display to obtain a panoramic video characterized by the panoramic video data. The electronic device having the display may be provided with a gyroscope. When the electronic device is turned over, the line of sight of the specified observation point may synchronously deflect with the turning over of the electronic device under the effect of the gyroscope. For example, when the user views a panoramic video through head-mounted VR glasses, the user may nod down, therefore, the specified observation point can deflect downward according to an influence of a gyroscope in the VR glasses. A video image below the previously presented video image can be displayed in the VR glasses.

In embodiments, the client may send a video loading request to the server, and the video loading request points to first panoramic video data in the server. The first panoramic video data corresponds to a first perspective of the user. The first perspective of the user may be a current perspective of the user, for example, the perspective 1 as shown in FIG. 1. In this way, the client may transmit the first panoramic video data through a first video stream group associated with the first perspective, and play content (i.e., a panoramic video characterized by the first panoramic video data) in the first video stream group to the user. Specifically, the first video stream group includes a first primary video stream and a first backup video stream that display the same content, so that the client can transmit the first panoramic video through the first primary video stream in the first video stream group, and play the content in the first primary video stream to a user.

In embodiments, the video loading request pointing to the panoramic video data in the server may refer to an identification of the panoramic video data carried in the video loading request. In this way, after receiving the video loading request, the server may extract the identification of the panoramic video data from the video loading request. After extracting the identification of the panoramic video data, the server may read the panoramic video data having the identification from the panoramic video database.

In embodiments, the video loading request may be a character string that is written according to a preset rule. The preset rule may be a network communication protocol that is followed by the client and the server. For example, the video loading request may be a character string written in accordance with the HTTP protocol. The preset rule may define various components in the video loading request and an order of arrangement between the various components. For example, the video loading request may include a request identifier field, a source IP address field, and a destination IP address field. The request identifier field may be filled in with an identification of the panoramic video data. The source IP address field may be filled in with an IP address of the client, and the destination IP address field may be filled in with an IP address of the server. In this way, the video loading request can be sent from the client to the server.

S104: Determine a video stream switching time in a second backup video stream in a second video stream group associated with a second perspective when the user's perspective is switched from the first perspective to the second perspective, wherein the video stream switching time is associated with a time length of a video slice in the second backup video stream.

In embodiments, in the plurality of video stream groups, video slices of a primary video stream in each video stream group have the same time length, and video slices of a backup video stream have the same time length. As such, the second video stream group associated with the second perspective includes a second primary video stream and a second backup video stream that display the same content, and a time length of a video slice in the second primary video stream may be the same as a time length of a video slice in the first primary video stream, and a time length of a video slice in the second backup video stream may be the same as a time length of a video slice in the first backup video stream.

In embodiments, when the perspective of the user is switched from the first perspective to the second perspective, a video stream switching time may be determined in the second backup video stream. The second backup video stream includes a plurality of backup video slices, and the video stream switching time is associated with a time length of the backup video slice. Specifically, since a switching position of a video stream is generally selected at the boundary of two adjacent video slices in the video stream, the client needs to switch a video stream from the first primary video stream to the second backup video stream at the boundary of two adjacent backup video slices in the second backup video stream. As such, when the perspective of the user is switched from the first perspective to the second perspective, the client may first determine a perspective switching time for switching the first perspective to the second perspective, and determine a target position in the second backup video stream that corresponds to the perspective switching time. When the target position is within a backup video slice in the second backup video stream, an end time of the backup video slice where the target position is located may be used as the video stream switching time. When the target position is at the boundary between two adjacent backup video slices in the second backup video stream, an end time of a backup video slice located next to the target position may be used as the video stream switching time. In this way, a time length for video stream switching of the client is only the time length of the backup video slice, or even less than the time length of the backup video slice.

S106: Switch from the first primary video stream to the second backup video stream to play content of the second backup video stream starting from the video stream switching time to the user, when the play time of the first primary video stream reaches the video stream switching time.

In embodiments, after determining the video stream switching time, the client continues playing the first primary video stream to the user, and when the play time of the first primary video stream reaches the video stream switching time, the video stream is switched from the first primary video stream to the second backup video stream. In this way, after the video stream is switched to the second backup video stream, the client no longer plays the first primary video stream to the user, instead the client starts playing the content of the second backup video stream to the user starting from the video stream switching time. As such, after switching a perspective, the user only needs to wait for a time duration between the video stream switching time and the perspective switching time, i.e., the time duration corresponding to the time length of the backup video slice, or even shorter, in order to view a video transmitted in the second backup video stream. If the time length of the backup video slice is 200 milliseconds, then the user does not even notice that the video viewed during the process of video stream switching is blurred. After the user is aware thereof, the video stream has been switched to the second backup video stream, and what is viewed by the user is a video having a higher resolution, which is capable of improving the viewing experience of the user.

Figure 4:
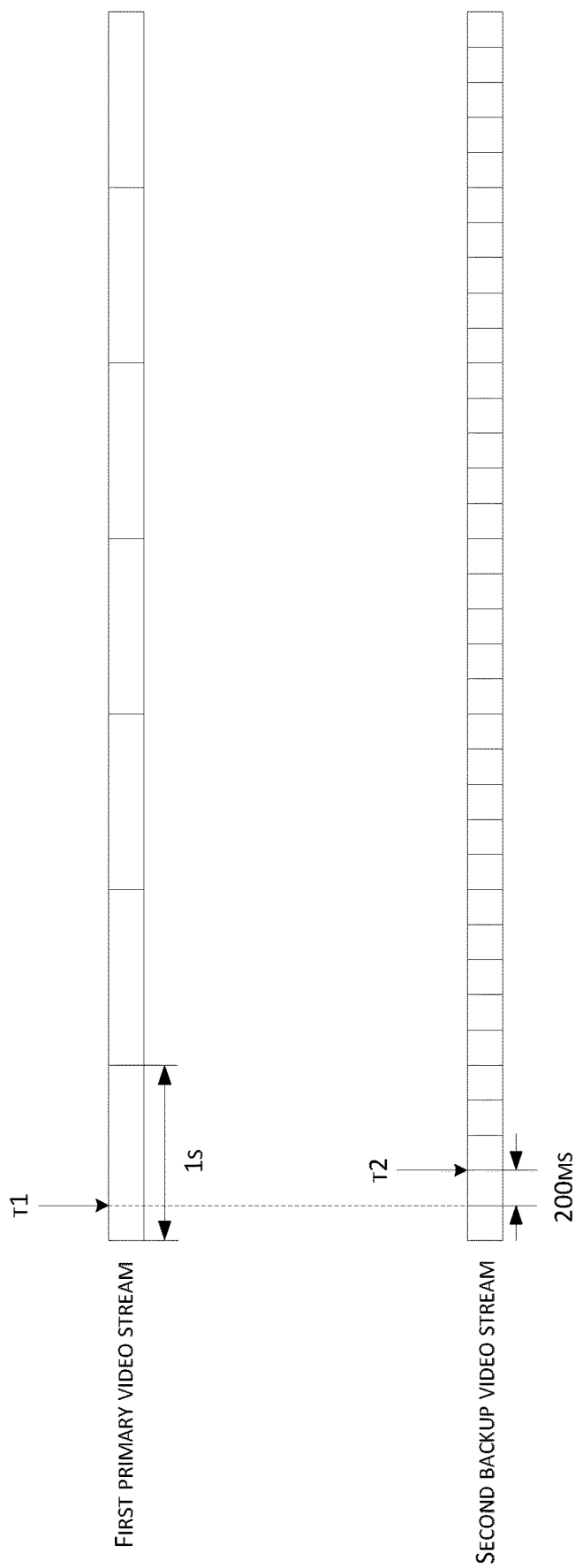
FIG. 4 is a schematic diagram of an application scenario of a method for switching scenes of a panoramic video in an embodiment of the present application.

In a specific application scenario, the client may be a pair of VR glasses. The user can watch a panoramic video by wearing the VR glasses. For example, as shown in FIG. 4, the first perspective of the user is the current perspective at the current moment, and the panoramic video currently viewed by the user is the first primary video stream in the first video stream group associated with the first perspective of the user. The first primary video stream includes a plurality of primary video slices, and each primary video slice may have a time length of 1 s. At the current moment, for example, at time t1, the user's perspective is switched from the first perspective to the second perspective, and an area viewed by the user is adjusted to an area corresponding to the second perspective. The second perspective is associated with the second video stream group. In the second video stream group, the second backup video stream includes multiple backup video slices, and each backup video slice may have a time length of 200 ms. At this time, a target position in the second backup video stream that corresponds to time t1 may be determined first. Since the target position may be located at the boundary of two adjacent backup video slices in the second backup video stream, an end time t2 of a backup video slice next to the target position is taken as the video stream switching time. In this way, when the play time of the first primary video stream reaches the time t2, the video stream can be switched from the first primary video stream to the second backup video stream. In the video stream switching process, a switching time period that the user needs to wait for a requires 200 ms. Although the user still views the lower resolution video of the area corresponding to the first perspective transmitted by the first primary video stream during the switching time period, the user is not easily aware thereof due to a relatively short video stream switching time. After the video stream is switched, the video of the target area viewed by the user is already a video of an area corresponding to the second perspective that is transmitted by the second backup video stream, and the viewing experience of the user is therefore not affected.

In an embodiment of the present application, the video stream switching time may be determined based on a transition time of the user perspective. Specifically, when the perspective of the user is switched from the first perspective to the second perspective, a perspective switching time for switching the first perspective to the second perspective is first determined. A corresponding target backup video slice in the second backup video stream is then determined according to the perspective switching time, to determine the video stream switching time.

In embodiments, after determining the perspective switching time, a target backup video slice corresponding to the perspective switching time in the second backup video stream may be determined. Specifically, when the perspective switching time is within a backup video slice in the second backup video stream, the backup video slice in which the perspective switching time is located may be used as the target backup video slice. Alternatively, when the perspective switching time is at the boundary of two adjacent backup video slices in the second backup video stream, a backup video slice located after the perspective switching time may be used as the target backup video slice.

In embodiments, after determining the target backup video slice, the client may determine the video stream switching time. Specifically, an end time of the target backup video slice may be used as the video stream switching time.

In an embodiment of the present application, in order to avoid an occurrence of a jam in a video playing process due to a failure in switching video streams, the time of the video stream switching may be determined based on a video buffer amount of the first primary video stream. Specifically, the client may detect a video buffer amount of the first primary video stream. For example, the video buffer amount of the first primary video stream may be detected before the user's perspective is switched from the first perspective to the second perspective. Alternatively, the video buffer amount of the first primary video stream may be detected when the user's perspective is being switched from the first perspective to the second perspective. Alternatively, the video buffer amount of the first primary video stream may also be detected after the user's perspective has been switched from the first perspective to the second perspective. If the video buffer amount of the first primary video stream is less than a specified buffer amount, the first primary video stream may then continue being played up to a specified time. A video buffer amount corresponding to the first primary video stream at the specified time is greater than or equal to the specified buffer amount. Finally, the video stream switching time may be determined according to a corresponding backup video slice in the second backup video stream at the specified time. In this way, even if the video stream switching at the video stream switching time fails, there is still enough video buffer amount in the first primary video stream while waiting for the next opportunity of the process of video stream switching, and playing can be continued to avoid a jamming situation, thus further enhancing the user's viewing experience.

In embodiments, the specified buffer amount may be a video buffer amount of a specified number of primary video slices in the first primary video stream, or may be a video buffer amount of a specified time length in the first primary video stream. In practical applications, the specified number or the specified time length may be specifically determined according to a resolution of a panoramic video that is actually played. For example, when the resolution of the actually played panoramic video is relatively high, the specified number is relatively large or the specified time length is relatively long. When the resolution of the actually played panoramic video is relatively low, the specified number is relatively small or the specified time length is relatively short.

In an embodiment of the present application, in order to ensure that the video stream can be played normally after the video stream switching, the method may further include: the client buffering content of the second backup video stream starting from an end time of a specific backup video slice since the perspective switching time, so that the buffered content of the second backup video stream after the video stream switching time is played to the user when the play time of the first primary video stream reaches the video stream switching time, wherein the specified backup video slice is used for representing a corresponding backup video slice in the second backup video stream at the perspective switching time. In this way, when the play time of the first primary video stream reaches the video stream switching time, the second backup video stream has a certain amount of video buffer starting from the video stream switching time, and thus the video can be guaranteed to be played normally after the video stream switching.

In addition, a video buffer amount of the first primary video stream may be determined when the user's perspective is switched from the first perspective to the second perspective. When the video buffer amount of the first primary video stream is less than the specified buffer amount, the first primary video stream may continue being played up to a specified time, wherein the video buffer amount corresponding to the first primary video stream at the specified time is greater than or equal to the specified buffer amount. At this time, the client starts to buffer the content in the second backup video stream starting from the end time of the specified backup video slice since the specified time. As such, the video can be guaranteed to be played normally after the video stream switching, and an occurrence of a jamming situation due to a failure in the video stream switching during a video playback can be avoided.

In an embodiment of the present application, when playing the second backup video stream, too many I frames (key frames) are resulted because the number of backup video slices is too large. This leads to a large amount of video data in the same video period, thus resulting in a higher video bit rate, which in turn increases the bandwidth and network load. Therefore, in order to reduce the video bit rate, the client may also switch the video stream from the second backup video stream to the second primary video stream in the second video stream group. As such, for a video of the same time length, the number of video slices that are required is small because a time length of a video slice in the second primary video stream is longer, and the video bit rate can be reduced by playing the second primary video stream. Specifically, after the video stream is switched to the second backup video stream, a target time can be determined based on a target primary video slice in the second primary video stream of the second video stream group which is corresponding to the current play time of the second backup video stream. When the play time of the second backup video stream reaches the target time, switching from the second backup video stream to the second primary video stream is performed, so that content of the second primary video stream starting from the target time is played to the user.

Figure 5:
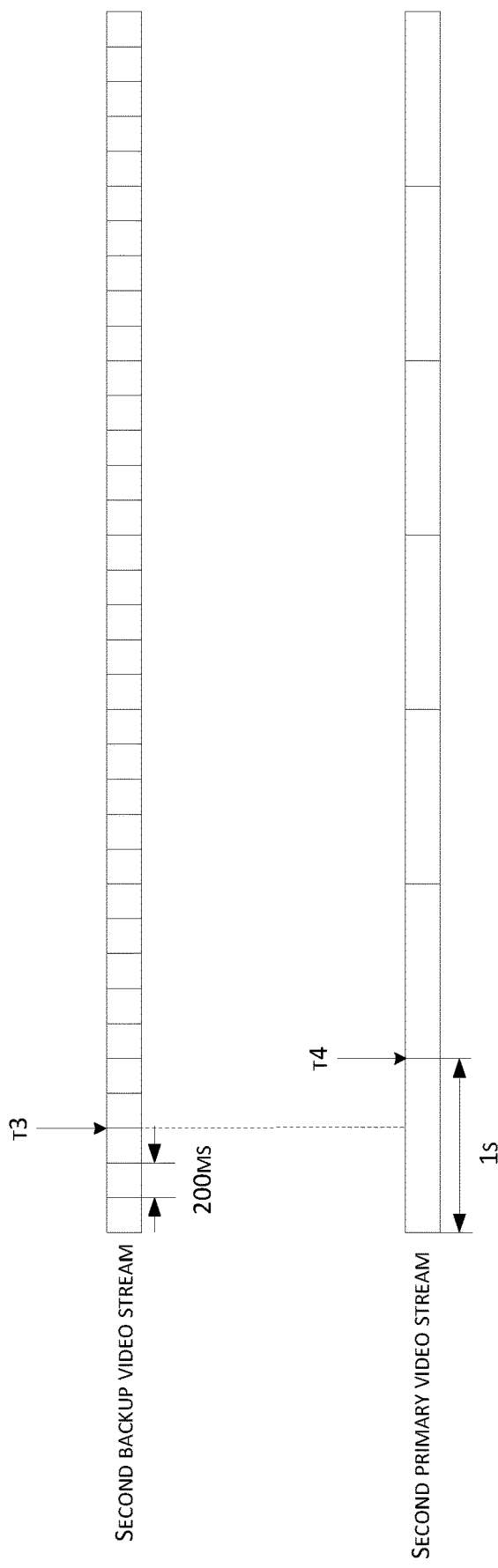
FIG. 5 is a schematic diagram of switching to a second primary video stream from a second backup video stream in an embodiment of the present application.

In embodiments, the target primary video slice in the second primary video stream of the second video stream group that is corresponding to the current play time of the second backup video stream may be determined. Specifically, when the current play time of the second backup video stream is within a primary video slice in the second primary video stream, the primary video slice where the current play time of the second backup video stream is located may be used as the target primary video slice. Alternatively, when the current play time of the second backup video stream is at the boundary of two adjacent primary video slices in the second primary video stream, a subsequent primary video slice located after the current play time of the second backup video stream may be used as the target primary video slice. For example, as shown in FIG. 5, the current play time of the second backup video stream is time t3, and the time t3 is within a primary video slice of the second primary video stream. At this time, the primary video slice in which the time t3 is located can be taken as the target primary video slice, and an end time t4 of the target primary video slice is taken as the target time.

In embodiments, after determining the target primary video slice, the client may determine the target time. Specifically, an end time of the target primary video slice may be used as the target time.

In embodiments, in order to avoid an occurrence of a jamming situation in the video playback process due to a failure in switching the video stream, the target time may be determined based on the video buffer amount of the second backup video stream. Specifically, the client may determine the video buffer amount of the second backup video stream. For example, the video buffer amount of the second backup video stream may be determined before the video stream played to the user is switched from the first primary video stream to the second backup video stream. Alternatively, the video buffer amount of the second backup video stream can be determined when the video stream played to the user is being switched from the first primary video stream to the second backup video stream. Alternatively, the video buffer amount of the second backup video stream can be determined after the video stream played to the user is switched from the first primary video stream to the second backup video stream. In an event that the video buffer amount of the second backup video stream is less than a specified buffer amount, the second backup video stream may continue being played till a specified time, wherein a corresponding video buffer amount of the second backup video stream at the specified time is greater than or equal to the specified buffer amount. Then, the target time may be determined based on a corresponding primary video slice in the second primary video stream at the specified time. In this way, even if the video stream switching performed at the target time fails, there is still enough video buffer amount in the second backup video stream while waiting for a next opportunity of video stream switching, and the video can be continuously played to avoid a jamming situation.

In an embodiment of the present application, in order to ensure that the video stream can be played normally after switching video stream, the method may further include: the client buffering content of the second primary video stream starting from an end time of a specific primary video slice since the current play time of the second backup video stream, so that the buffered content of the second primary video stream after the target time is played to the user when the play time of the second backup video stream reaches the target time, wherein the specified primary video slice is used for representing a corresponding primary video slice in the second primary video stream at the current play time of the second backup video stream. In this way, when the play time of the second backup video stream reaches the video target time, the second primary video stream has a certain amount of video buffer starting from the target time, and thus the video can be guaranteed to be played normally after the video stream switching.

In addition, in an event that the video stream played to the user is switched from the first primary video stream to the second backup video stream, the video buffer amount of the second backup video stream may be determined. If the video buffer amount of the second backup video stream is less than a specified buffer amount, the second backup video stream may continue being played up to a specified time, wherein a corresponding video buffer amount of the second backup video stream at the specified time is greater than or equal to the specified buffer amount. At this time, the client starts to buffer the content in the second primary video stream from the end time of the specified primary video slice since the specified time. As such, the video can be guaranteed to be played normally after switching video stream, and an occurrence of a jamming situation due to a failure in switching video stream during a video playback can also be avoided.

In embodiments, functions implemented in the above method operations may be implemented by a computer program. The computer program may be stored in a computer storage medium. In particular, the computer storage medium may be coupled to a processor. The processor can thereby read the computer program from the computer storage medium. The computer storage medium may be configured to store a plurality of video stream groups, and the video stream groups are associated with perspectives of a user. The video stream group includes a primary video stream and a backup video stream displaying the same content. A time length of a video slice in the backup video stream is less than a time length of a video slice in the primary video stream. When the computer program is executed by the processor, the following functions can be implemented:

S102: Play a first primary video stream in a first video stream group associated with a first perspective of a user to the user;

S104: Determine a video stream switching time in a second backup video stream in a second video stream group associated with a second perspective when the user's perspective is switched from the first perspective to the second perspective, wherein the video stream switching time is associated with a time length of a video slice in the second backup video stream; and S106: Switch from the first primary video stream to the second backup video stream to play content of the second backup video stream starting from the video stream switching time to the user, when play time of the first primary video stream reaches the video stream switching time.

In an embodiment, when the computer program is executed by the processor, the operation of determining the video stream switching time includes the following operations:

determining a perspective switching time for switching the first perspective to the second perspective; and determining the video stream switching time based on a target backup video slice corresponding to the perspective switching time in the second backup video stream.

In an embodiment, when the computer program is executed by the processor, the target backup video slice is determined according to the following operations:

taking a backup video slice where the perspective switching time is located as the target backup video slice when the perspective switching time is within the backup video slice in the second backup video stream; and taking a backup video slice located after the perspective switching time as the target backup video slice when the perspective switching time is at the boundary between two adjacent backup video slices in the second backup video stream.

In an embodiment, when the computer program is executed by the processor, the operation of determining the video stream switching time includes the following operation:

taking an end time of the target backup video slice as the video stream switching time.

In an embodiment, when the computer program is executed by the processor, the following operations are also implemented:

determining a target time based on a target primary video slice corresponding to a current play time of the second backup video stream in the second primary video stream of the second video stream group; and switching from the second backup video stream to the second primary video stream when the play time of the second backup video stream reaches the target time, so that content of the second primary video stream starting from the target time is played to the user.

It should be noted that the functions that can be implemented by the computer program in the above computer storage medium can be referenced to the foregoing method embodiments. Technical effects that are achieved are similar to the technical effects implemented in the foregoing method embodiments, and are not repeatedly described herein.

Figure 6:
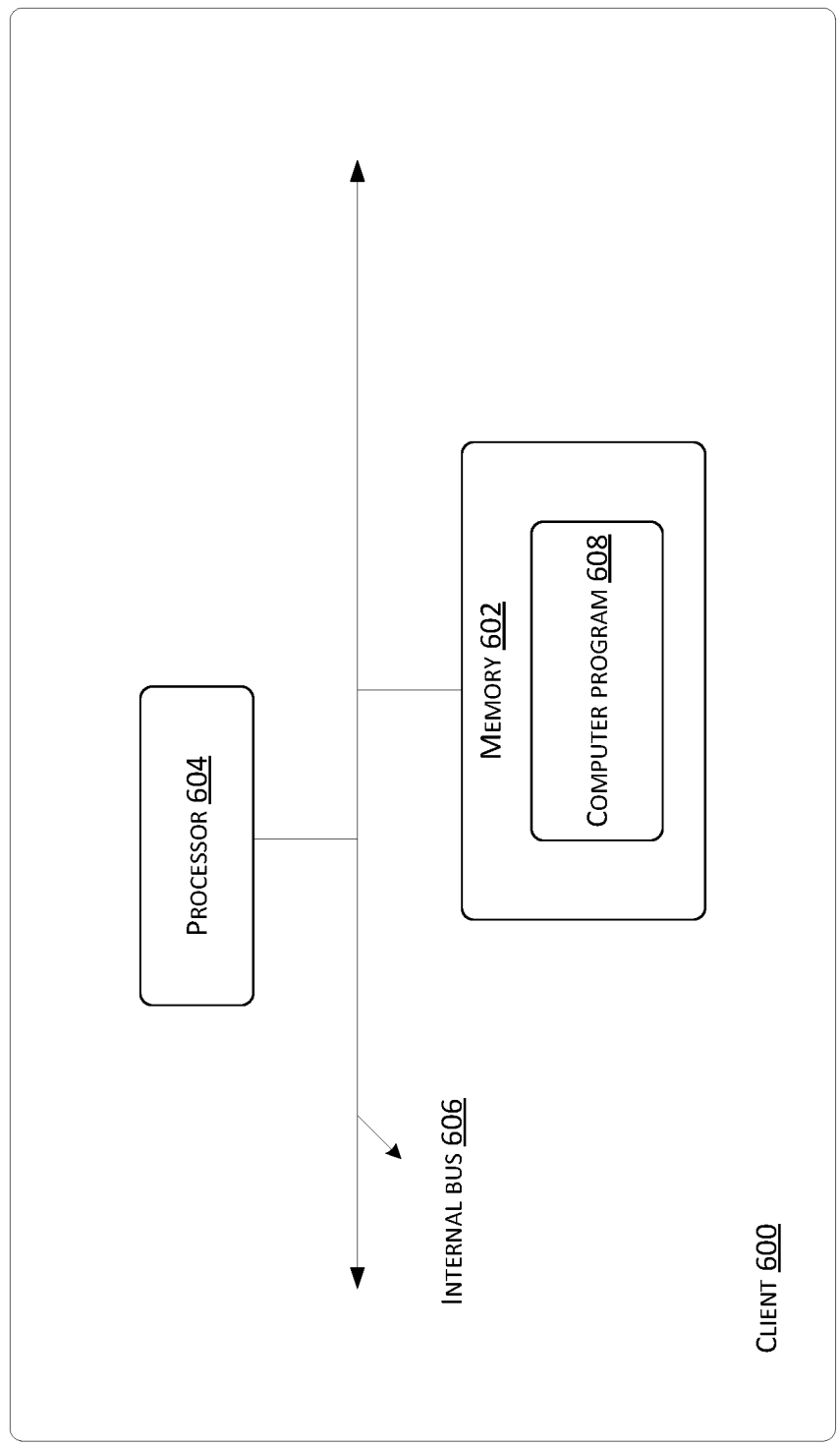
FIG. 6 is a schematic structural diagram of a client in an embodiment of the present application.

Referring to FIG. 6, the present application also provides a client 600. The client 600 includes a memory 602 and a processor 604. In some embodiments, the client 600 may further include an internal bus 606. The memory 602 is operative to store a computer program 606 and a plurality of video stream groups. The video stream groups are associated with perspectives of a user. The video stream group includes a primary video stream and a backup video stream that display the same content. A time length of a video slice in the backup video stream is less than a time length of a video slice in the primary video stream. When the computer program 606 is executed by the processor 604, the following operations are implemented:

Operation S102: Play a first primary video stream in a first video stream group associated with a first perspective of a user to the user;

Operation S104: Determine a video stream switching time in a second backup video stream in a second video stream group associated with a second perspective when the user's perspective is switched from the first perspective to the second perspective, wherein the video stream switching time is associated with a time length of a video slice in the second backup video stream; and Operation S106: Switch from the first primary video stream to the second backup video stream to play content of the second backup video stream starting from the video stream switching time to the user, when the play time of the first primary video stream reaches the video stream switching time.

In embodiments, the memory 602 may include a physical device configured to store information, typically by digitizing the information and then storing thereof in a medium that utilizes electrical, magnetic or optical means, etc. The memory 602 according to the present embodiment may also include a device that stores information using an electric energy method, such as a RAM, a ROM, or the like; a device that stores information using a magnetic energy method, such as a hard disk, a floppy disk, a magnetic tape, a magnetic core memory, a magnetic bubble memory, and a USB flash drive; a device that stores information using an optical method, such as a CD or a DVD. Apparently, other types of memory, such as quantum memory, graphene memory, etc., may be used.

In embodiments, the memory 602 may include a form of computer storage media such as a volatile memory, a random access memory (RAM) and/or a non-volatile memory, for example, a read-only memory (ROM) or a flash RAM. The memory 602 is an example of a computer storage media.

The computer storage media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer storage media does not include transitory media, such as modulated data signals and carrier waves.

In embodiments, the processor 604 can be implemented in any suitable manner. For example, the processor can take a form of, for example, a microprocessor or processor, and computer readable media, logic gates, switches, ASIC (Application Specific Integrated Circuit), a programmable logic controller, and an embedded microcontroller, etc., storing computer readable program codes (e.g., software or firmware) that are executable by the (micro) processor.

In an embodiment, when the computer program 608 is executed by the processor 604, the operation of determining the video stream switching time includes the following operations:

determining a perspective switching time for switching the first perspective to the second perspective; and determining the video stream switching time based on a target backup video slice corresponding to the perspective switching time in the second backup video stream.

In an embodiment, when the computer program 608 is executed by the processor 604, the target backup video slice is determined according to the following operations:

taking a backup video slice where the perspective switching time is located as the target backup video slice when the perspective switching time is within the backup video slice in the second backup video stream; and taking a backup video slice located after the perspective switching time as the target backup video slice when the perspective switching time is at the boundary between two adjacent backup video slices in the second backup video stream.

In an embodiment, when the computer program 608 is executed by the processor 604, the operation of determining the video stream switching time includes the following operation:

taking an end time of the target backup video slice as the video stream switching time.

In an embodiment, when the computer program 608 is executed by the processor 604, the following operations are also implemented:

determining a video buffer amount of the first primary video stream;

continuing playing the first primary video stream up to a specified time when the video buffer amount of the first primary video stream is less than a specified buffer amount, wherein a corresponding video buffer amount of the first primary video stream at the specified time is greater than or equal to the specified buffer amount; and determining the video stream switching time based on a backup video slice corresponding to the specific time in the second backup video stream.

In an embodiment, when the computer program 608 is executed by the processor 604, the following operation is also implemented:

buffering content of the second backup video stream starting from an end time of a specific backup video slice since the perspective switching time, so that the buffered content of the second backup video stream after the video stream switching time is played to the user when the play time of the first primary video stream reaches the video stream switching time, wherein the specified backup video slice is used for representing a corresponding backup video slice in the second backup video stream at the perspective switching time.

In an embodiment, when the computer program 608 is executed by the processor 604, the following operations are also implemented:

determining a target time based on a target primary video slice corresponding to a current play time of the second backup video stream in the second primary video stream of the second video stream group; and switching from the second backup video stream to the second primary video stream when the play time of the second backup video stream reaches the target time, so that content of the second primary video stream starting from the target time is played to the user.

In an embodiment, when the computer program 608 is executed by the processor 604, the target primary video slice is determined according to the following operations:

taking a primary video slice where the current play time of the second backup video stream is located as the target primary video slice when the current play time of the second backup video stream is within the primary video slice in the second primary video stream; and taking a primary video slice located after the current play time of the second backup video stream as the target primary video slice when the current play time of the second backup video stream is at the boundary of two adjacent primary video slices in the second primary video stream.

In an embodiment, when the computer program 608 is executed by the processor 604, the operation of determining the target time comprises the following operation:

taking an end time of the target primary video slice as the target time.

In an embodiment, when the computer program 608 is executed by the processor 604, the following operations are also implemented:

determining a video buffer amount of the second backup video stream;

continuing playing the second backup video stream up to a specified time when the video buffer amount of the second backup video stream is less than a specified buffer amount, wherein a corresponding video buffer amount of the second backup video stream at the specified time is greater than or equal to the specified buffer amount; and determining the target time based on a primary video slice corresponding to the specific time in the second primary video stream.

In an embodiment, when the computer program 608 is executed by the processor 604, the following operation is also implemented:

buffering content of the second primary video stream starting from an end time of a specific primary video slice since the current play time of the second backup video stream, so that the buffered content of the second primary video stream after the target time is played to the user when the play time of the second backup video stream reaches the target time, wherein the specified primary video slice is used for representing a corresponding primary video slice in the second primary video stream at the current playback time of the second backup video stream.

Details of functions implemented by the memory and the processor of the client provided by the embodiments of the present specification can be referenced to the foregoing embodiments of the present specification for explanation, and can achieve the technical effects of the foregoing embodiments, which are not repeatedly described herein.

As can be seen from the above, the present application can respectively associate a plurality of video stream groups with different perspectives of a user. The video stream group includes a primary video stream and a backup video stream displaying the same content, and a time length of a video slice in the backup video stream is less than a time length of a video slice in the primary video stream. In this case, when the user's perspective is switched from a first perspective to a second perspective, a primary video stream associated with the first perspective is switched to a second backup video stream associated with the second perspective within a time length of a video slice in the second backup video stream associated with the second perspective. In this way, although a time length of a video slice in the first primary video stream is relatively long, the technical solutions of the present application can complete switching between video streams in a relatively short time, so as to prevent the user from perceiving that a video that is viewed during a process of switching between the video streams is blurred, thereby improving the effects of switching scenes of a panoramic video.

In the 1990s, a technical improvement may be clearly differentiated by hardware improvements (for example, improvements in circuit structures such as diodes, transistors, switches, etc.) or software improvements (improvements in method processes). However, with the development of technologies, many of today's method process improvements can be seen as a direct improvement in hardware circuit architectures. Designers may incorporate improved methods to hardware circuits to get the corresponding hardware circuit structures. Accordingly, a method of process improvement may be achieved with hardware entity modules. For example, a programmable logic device (Programmable Logic Device, PLD) (e.g., Field Programmable Gate Array, FPGA) is one such integrated circuit whose logic functions are determined through programming the device by a user. With a designer to program a digital system for "integrating" into a PLD on his/her own, it is not necessary to have a chip manufacturer to design and manufacture a dedicated integrated circuit chip. Further, by replacing manually produced integrated circuit chips, this type of programming is also mostly replaced by "logic compiler" software. Similar to a software compiler, such logic compiler compiles original codes written by a specific programming language, which is called a hardware description language (Hardware Description Language, HDL). HDL does not include only one type, and there are many kinds, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most common ones are VHDL (Very-High-Speed Integrated Circuit Hardware Description Language) and Verilog. One skilled in the art should understand that a hardware circuit implementing the logic method flow may be easily achieved by performing a little logic programming and compiling these methods into an integrated circuit using hardware description language.

One skilled in the art also knows that there are other methods implementing a client and a server in addition to pure computer readable program codes. Logic programming of the methods may be performed to make a client and a server implement the same functionalities in forms of logic gates, switches, application specific integrated circuits, programmable logic controllers, and embedded microcontrollers. Therefore, a client and a server may be considered to be a hardware component, and an apparatus that is used for implementing various functions and is included therein can also be considered as a structure inside a hardware component. An apparatus that is used for implementing various functions can be software module(s) implementing the method and/or structure(s) in hardware component(s).

As can be seen from the description of the above implementations, one skilled in the art can clearly understand that the present disclosure can be implemented by software with a necessary universal hardware platform. Based on this understanding, the essence of the technical solutions of the present disclosure, or portions that make contributions to the existing technologies can be manifested in a form of a software product. The computer software product may be stored in a storage medium such as a ROM/RAM, a magnetic disk, an optical disk, etc., which includes instructions to cause a computing device (which may be a personal computer, a server, or a network device, etc.) to perform the method described in each embodiment or certain portions of the embodiment of the present disclosure.

Various embodiments in the specification of the present application are described in a progressive manner. The same and similar parts of the various embodiments can be referenced with one another. The focus of each embodiment is different from those of other embodiments. In particular, for the embodiments of the computer storage media, servers and clients, references can be made to relevant portions of the method embodiments.

The present disclosure may be described in the general context of computer-executable instructions executed by a computer, such as program modules. In general, program modules include routines, programs, objects, components, data structures, etc., that perform specific tasks or implement specific abstract data types. The present disclosure may also be implemented in a distributed computing environment. In these distributed computing environments, tasks are performed by a remote processing device connected via a communication network. In a distributed computing environment, the program modules may be located in local and remote computer storage media, including storage devices.

Although the present application is described using the embodiments, one of ordinary skill in the art can understand that a number of variations and modifications exist in the present application without departing the spirit of the present application. The appended claims are intended to cover these variations and modifications without departing the spirit of the present application.

The present disclosure can further be understood using the following clauses.

Clause 1: A client, wherein the client comprises memory and a processor, the memory being operative to store a computer program and a plurality of video stream groups, and the video stream groups being associated with perspectives of a user, and wherein the video stream group comprises a primary video stream and a backup video stream that display the same content, a time length of a video slice in the backup video stream is less than a time length of a video slice in the primary video stream, and when the computer program is executed by the processor, the following operations are implemented: playing a first primary video stream in a first video stream group associated with a first perspective of a user to the user; determining a video stream switching time in a second backup video stream in a second video stream group associated with a second perspective when the user's perspective is switched from the first perspective to the second perspective, wherein the video stream switching time is associated with a time length of a video slice in the second backup video stream; and switching from the first primary video stream to the second backup video stream to play content of the second backup video stream starting from the video stream switching time to the user, when the play time of the first primary video stream reaches the video stream switching time.

Clause 2: The client of Clause 1, wherein: when the computer program is executed by the processor, determining the video stream switching time comprises the following operations: determining a perspective switching time for switching the first perspective to the second perspective; and determining the video stream switching time based on a target backup video slice corresponding to the perspective switching time in the second backup video stream.

Clause 3: The client of Clause 2, wherein: when the computer program is executed by the processor, the target backup video slice is determined according to the following operations: taking a backup video slice where the perspective switching time is located as the target backup video slice when the perspective switching time is within the backup video slice in the second backup video stream; and taking a backup video slice located after the perspective switching time as the target backup video slice when the perspective switching time is at the boundary between two adjacent backup video slices in the second backup video stream.

Clause 4: The client of Clause 2 or 3, wherein: when the computer program is executed by the processor, determining the video stream switching time comprises the following operation: taking an end time of the target backup video slice as the video stream switching time.

Clause 5: The client of Clause 2, wherein: when the computer program is executed by the processor, the following operations are also implemented: determining a video buffer amount of the first primary video stream; continuing playing the first primary video stream up to a specified time when the video buffer amount of the first primary video stream is less than a specified buffer amount, wherein a corresponding video buffer amount of the first primary video stream at the specified time is greater than or equal to the specified buffer amount; and determining the video stream switching time based on a backup video slice corresponding to the specific time in the second backup video stream.

Clause 6: The client of Clause 1, wherein: when the computer program is executed by the processor, the following operation is also implemented: buffering content of the second backup video stream starting from an end time of a specific backup video slice since the perspective switching time, so that the buffered content of the second backup video stream after the video stream switching time is played to the user when the play time of the first primary video stream reaches the video stream switching time, wherein the specified backup video slice is used for representing a corresponding backup video slice in the second backup video stream at the perspective switching time.

Clause 7: The client of Clause 1, wherein: when the computer program is executed by the processor, the following operations are also implemented: determining a target time based on a target primary video slice corresponding to a current play time of the second backup video stream in the second primary video stream of the second video stream group; and switching from the second backup video stream to the second primary video stream when play time of the second backup video stream reaches the target time, so that content of the second primary video stream starting from the target time is played to the user.

Clause 8: The client of Clause 7, wherein: when the computer program is executed by the processor, the target primary video slice is determined according to the following operations: taking the primary video slice where the current play time of the second backup video stream is located as the target primary video slice when the current playback time of the second backup video stream is within a primary video slice in the second primary video stream; and taking a primary video slice located after the current play time of the second backup video stream as the target primary video slice when the current play time of the second backup video stream is at the boundary of two adjacent primary video slices in the second primary video stream.

Clause 9: The client of Clause 7 or 8, wherein: when the computer program is executed by the processor, determining the target time comprises the following operation: taking an end time of the target primary video slice as the target time.

Clause 10: The client of Clause 7, wherein: when the computer program is executed by the processor, the following operations are also implemented: determining a video buffer amount of the second backup video stream; continuing playing the second backup video stream up to a specified time when the video buffer amount of the second backup video stream is less than a specified buffer amount, wherein a corresponding video buffer amount of the second backup video stream at the specified time is greater than or equal to the specified buffer amount; and determining the target time based on a primary video slice corresponding to the specific time in the second primary video stream.

Clause 11: The Clause of claim 7, wherein: when the computer program is executed by the processor, the following operation is also implemented: buffering content of the second primary video stream starting from an end time of a specific primary video slice since the current playback time of the second backup video stream, so that the buffered content of the second primary video stream after the target time is played to the user when the play time of the second backup video stream reaches the target time, wherein the specified primary video slice is used for representing a corresponding primary video slice in the second primary video stream at the current play time of the second backup video stream.

Clause 12: A computer storage media, wherein the computer storage media is configured to store a plurality of video stream groups, the video stream groups being associated with perspectives of a user, wherein the video stream group comprises a primary video stream and a backup video stream displaying the same content, a time length of a video slice in the backup video stream is less than a time length of a video slice in the primary video stream, and when the computer program is executed by the processor, the following operations can be implemented: playing a first primary video stream in a first video stream group associated with a first perspective of a user to the user; determining a video stream switching time in a second backup video stream in a second video stream group associated with a second perspective when the user's perspective is switched from the first perspective to the second perspective, wherein the video stream switching time is associated with a time length of a video slice in the second backup video stream; and switching from the first primary video stream to the second backup video stream to play content of the second backup video stream starting from the video stream switching time to the user, when the play time of the first primary video stream reaches the video stream switching time.

Clause 13: The computer storage media of Clause 12, wherein: when the computer program is executed by the processor, determining the video stream switching time comprises the following operations: determining a perspective switching time for switching the first perspective to the second perspective; and determining the video stream switching time based on a target backup video slice corresponding to the perspective switching time in the second backup video stream.

Clause 14: The computer storage media of Clause 13, wherein: when the computer program is executed by the processor, the target backup video slice is determined according to the following operations: taking a backup video slice where the perspective switching time is located as the target backup video slice when the perspective switching time is within the backup video slice in the second backup video stream; and taking a backup video slice located after the perspective switching time as the target backup video slice when the perspective switching time is at the boundary between two adjacent backup video slices in the second backup video stream.

Clause 15: The computer storage media of Clause 13 or 14, wherein: when the computer program is executed by the processor, determining the video stream switching time comprises the following operation: taking an end time of the target backup video slice as the video stream switching time.

Clause 16: The computer storage media of Clause 12, wherein: when the computer program is executed by the processor, the following operations are also implemented: determining a target time based on a target primary video slice corresponding to a current play time of the second backup video stream in the second primary video stream of the second video stream group; and switching from the second backup video stream to the second primary video stream when the play time of the second backup video stream reaches the target time, so that content of the second primary video stream starting from the target time is played to the user.

Clause 17: A method for switching scenes of a panoramic video, wherein a plurality of video stream groups are provided, the video stream groups being associated with perspectives of a user, wherein the video stream group comprises a primary video stream and a backup video stream displaying the same content, a time length of a video slice in the backup video stream is less than a time length of a video slice in the primary video stream, and the method comprises: playing a first primary video stream in a first video stream group associated with a first perspective of a user to the user; determining a video stream switching time in a second backup video stream of a second video stream group associated with a second perspective when a perspective of the user is switched from the first perspective to the second perspective, wherein the video stream switching time is associated with a time length of a video slice in the second backup video stream; and switching from the first primary video stream to the second backup video stream to play to the user content of the second backup video stream starting from the video stream switching time when the play time of the first primary video stream reaches the video stream switching time.

Clause 18: The method of Clause 17, wherein determining the video stream switching time comprises: determining a perspective switching time for switching the first perspective to the second perspective; and determining the video stream switching time based on a target backup video slice corresponding to the perspective switching time in the second backup video stream.

Clause 19: The method of Clause 18, wherein the target backup video slice is determined according to the following operations: taking a backup video slice where the perspective switching time is located as the target backup video slice when the perspective switching time is within the backup video slice in the second backup video stream; and taking a backup video slice located after the perspective switching time as the target backup video slice when the perspective switching time is at the boundary between two adjacent backup video slices in the second backup video stream.

Clause 20: The method of Clause 18 or 19, wherein determining the video stream switching time comprises: taking an end time of the target backup video slice as the video stream switching time.

Clause 21: The method of Clause 17, further comprising: determining a target time based on a target primary video slice corresponding to a current play time of the second backup video stream in the second primary video stream of the second video stream group; and switching from the second backup video stream to the second primary video stream when the play time of the second backup video stream reaches the target time, so that content of the second primary video stream starting from the target time is played to the user.

What is claimed is:

1. A client comprising:
   one or more processors; and
   memory storing executable instructions that, when executed by the one or more processors, cause the one or more processors to perform acts comprising:
   playing a first primary video stream in a first video stream group associated with a first perspective of a user to the user;
   determining a video stream switching time in a second backup video stream in a second video stream group associated with a second perspective when the user's perspective is oriented from the first perspective to the second perspective, wherein the video stream switching time is associated with a time length of a video slice in the second backup video stream and occurs after the user's perspective is oriented from the first perspective to the second perspective; and
   switching from the first primary video stream to the second backup video stream to play content of the second backup video stream starting from the video stream switching time to the user, when a play time of the first primary video stream reaches the video stream switching time.

2. The client of claim 1, wherein determining the video stream switching time comprises:
   determining a perspective switching time for orienting the first perspective to the second perspective; and
   determining the video stream switching time based on a target backup video slice corresponding to the perspective switching time in the second backup video stream.

3. The client of claim 2, the acts further comprising determining the target backup video slice, wherein determining the target backup video slice comprises:
   taking a backup video slice where the perspective switching time is located as the target backup video slice when the perspective switching time is within the backup video slice in the second backup video stream; and
   taking a backup video slice located after the perspective switching time as the target backup video slice when the perspective switching time is at the boundary between two adjacent backup video slices in the second backup video stream.

4. The client of claim 2, wherein determining the video stream switching time comprises taking an end time of the target backup video slice as the video stream switching time.

5. The client of claim 2, the acts further comprising:
   determining a video buffer amount of the first primary video stream;
   continuing playing the first primary video stream up to a specified time when the video buffer amount of the first primary video stream is less than a specified buffer amount, wherein a corresponding video buffer amount of the first primary video stream at the specified time is greater than or equal to the specified buffer amount; and
   determining the video stream switching time based on a backup video slice corresponding to the specific time in the second backup video stream.

6. The client of claim 2, the acts further comprising:
   buffering content of the second backup video stream starting from an end time of a specific backup video slice since the perspective switching time, so that the buffered content of the second backup video stream after the video stream switching time is played to the user when the play time of the first primary video stream reaches the video stream switching time, wherein the specified backup video slice is used for representing a corresponding backup video slice in the second backup video stream at the perspective switching time.

7. The client of claim 1, the acts further comprising:
   determining a target time based on a target primary video slice corresponding to a current play time of the second backup video stream in a second primary video stream of the second video stream group; and
   switching from the second backup video stream to the second primary video stream when the play time of the second backup video stream reaches the target time, so that content of the second primary video stream starting from the target time is played to the user.

8. The client of claim 7, the acts further comprising determining the target primary video slice, wherein determining the target primary video slice comprises:
- taking a primary video slice where the current play time of the second backup video stream is located as the target primary video slice when the current play time of the second backup video stream is within the primary video slice in the second primary video stream; and
- taking a primary video slice located after the current play time of the second backup video stream as the target primary video slice when the current playback time of the second backup video stream is at the boundary of two adjacent primary video slices in the second primary video stream.

9. The client of claim 7, wherein determining the target time comprises taking an end time of the target primary video slice as the target time.

10. The client of claim 7, the acts further comprising:
- determining a video buffer amount of the second backup video stream;
- continuing playing the second backup video stream up to a specified time when the video buffer amount of the second backup video stream is less than a specified buffer amount, wherein a corresponding video buffer amount of the second backup video stream at the specified time is greater than or equal to the specified buffer amount; and
- determining the target time based on a primary video slice corresponding to the specific time in the second primary video stream.

11. The client of claim 7, the acts further comprising:
- buffering content of the second primary video stream starting from an end time of a specific primary video slice since the current play time of the second backup video stream, so that the buffered content of the second primary video stream after the target time is played to the user when the play time of the second backup video stream reaches the target time, wherein the specified primary video slice is used for representing a corresponding primary video slice in the second primary video stream at the current play time of the second backup video stream.

12. One or more computer storage media storing executable instructions that, when executed by one or more processors, cause the one or more processors to perform acts comprising:
- playing a first primary video stream in a first video stream group associated with a first perspective of a user to the user;
- determining a video stream switching time in a second backup video stream in a second video stream group associated with a second perspective when the user's perspective is oriented from the first perspective to the second perspective, wherein the video stream switching time is associated with a time length of a video slice in the second backup video stream and occurs after the user's perspective is oriented from the first perspective to the second perspective; and
- switching from the first primary video stream to the second backup video stream to play content of the second backup video stream starting from the video stream switching time to the user, when a play time of the first primary video stream reaches the video stream switching time.

13. The one or more computer storage media of claim 12, wherein determining the video stream switching time comprises:
- determining a perspective switching time for orienting the first perspective to the second perspective; and
- determining the video stream switching time based on a target backup video slice corresponding to the perspective switching time in the second backup video stream.

14. The one or more computer storage media of claim 13, the acts further comprising determining the target backup video slice, wherein determining the target backup video slice comprises:
- taking a backup video slice where the perspective switching time is located as the target backup video slice when the perspective switching time is within the backup video slice in the second backup video stream; and
- taking a backup video slice located after the perspective switching time as the target backup video slice when the perspective switching time is at the boundary between two adjacent backup video slices in the second backup video stream.

15. The one or more computer storage media of claim 13, wherein determining the video stream switching time comprises taking an end time of the target backup video slice as the video stream switching time.

16. The one or more computer storage media of claim 12, the acts further comprising:
- determining a target time based on a target primary video slice corresponding to a current play time of the second backup video stream in a second primary video stream of the second video stream group; and
- switching from the second backup video stream to the second primary video stream when the play time of the second backup video stream reaches the target time, so that content of the second primary video stream starting from the target time is played to the user.

17. A method comprising:
- playing a first primary video stream in a first video stream group associated with a first perspective of a user to the user;
- determining a video stream switching time in a second backup video stream of a second video stream group associated with a second perspective when a perspective of the user is oriented from the first perspective to the second perspective, wherein the video stream switching time is correlated with a time length of a video slice in the second backup video stream and occurs after the user's perspective is oriented from the first perspective to the second perspective; and
- switching from the first primary video stream to the second backup video stream to play to the user content of the second backup video stream starting from the video stream switching time when a play time of the first primary video stream reaches the video stream switching time.

18. The method of claim 17, wherein determining the video stream switching time comprises:
- determining a perspective switching time for orienting the first perspective to the second perspective; and
- determining the video stream switching time based on a target backup video slice corresponding to the perspective switching time in the second backup video stream.

19. The method of claim 18, further comprising determining the target backup video slice, wherein determining the target backup video slice comprises:
- taking a backup video slice where the perspective switching time is located as the target backup video slice when the perspective switching time is within the backup video slice in the second backup video stream; and
- taking a backup video slice located after the perspective switching time as the target backup video slice when the perspective switching time is at the boundary between two adjacent backup video slices in the second backup video stream.

20. The method of claim 17, further comprising:
- determining a target time based on a target primary video slice corresponding to a current play time of the second backup video stream in a second primary video stream of the second video stream group; and
- switching from the second backup video stream to the second primary video stream when the play time of the second backup video stream reaches the target time, so that content of the second primary video stream starting from the target time is played to the user.

* * * * *